Jan. 13, 1925. 1,522,527
H. LYNN
TREE TRIMMER
Filed Jan. 31, 1924
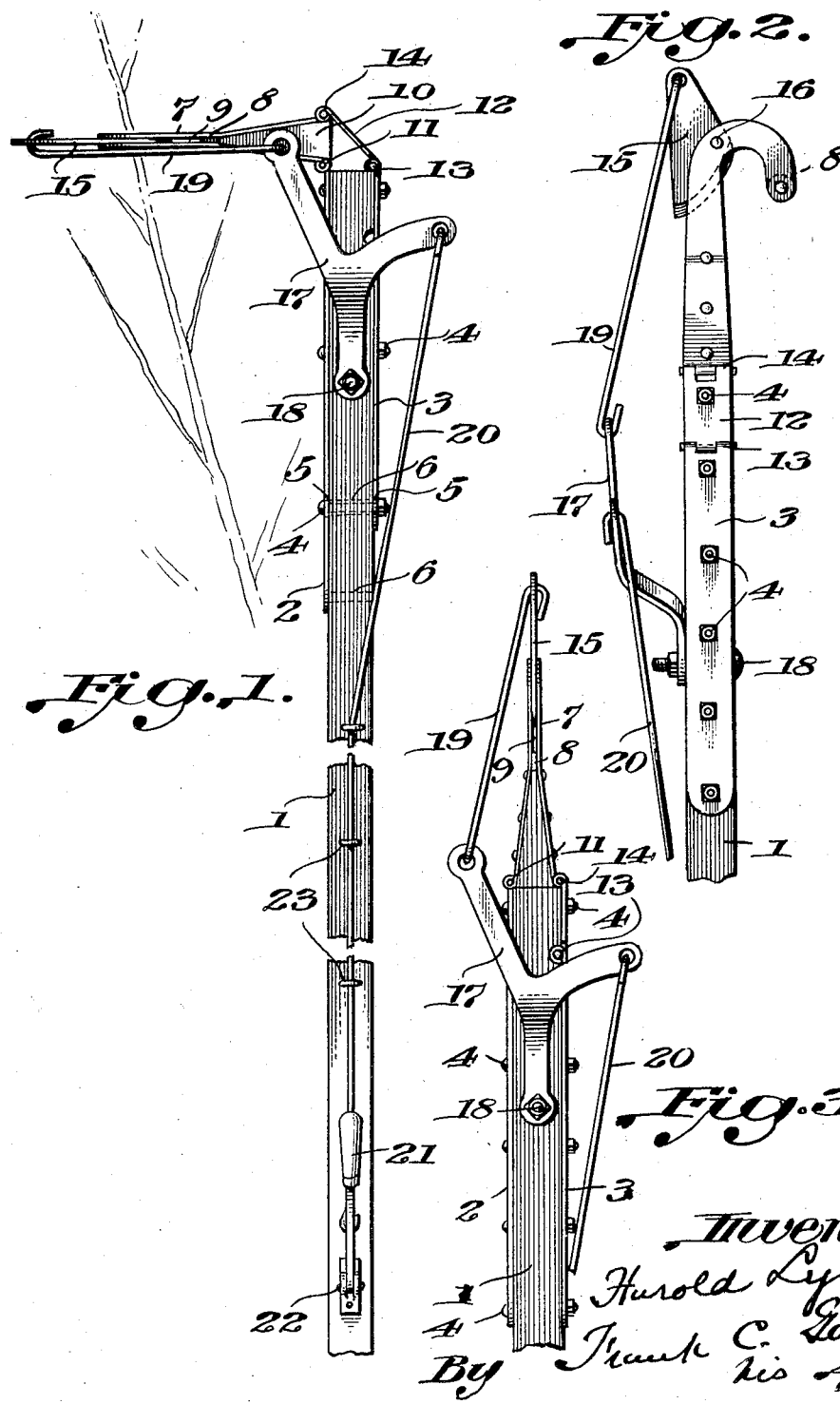

Patented Jan. 13, 1925.

1,522,527

UNITED STATES PATENT OFFICE.

HAROLD LYNN, OF EVANSVILLE, INDIANA.

TREE TRIMMER.

Application filed January 31, 1924. Serial No. 689,692.

*To all whom it may concern:*

Be it known that I, HAROLD LYNN, a citizen of the United States, residing at Evansville, in the county of Vanderburg and State of Indiana, have invented certain new and useful Improvements in Tree Trimmers, of which the following is a specification.

This invention relates to tree trimmers of that general class employing a hook to engage the limb or branch, a pivoted knife which is adapted to cut the branch or limb when the latter is engaged by the hook, and means for operating the knife.

The object of the invention is to provide an improved tree trimmer wherein the hook and knife will be so arranged that they may be conveniently used to trim vertical or nearly vertical limbs.

A further object is to provide an improved tree trimmer wherein the knife and hook are adapted to be arranged in one position or another so that vertical or nearly vertical branches may be trimmed when the aforesaid parts are disposed in one fashion and, horizontal or nearly horizontal limbs or branches may be trimmed when the parts are arranged in another position, thus providing a tree trimmer which may be used for severing branches, regardless of the position of the latter.

One embodiment of the invention is shown in the accompanying drawings and is hereinafter described but I wish it understood that the invention is susceptible of modification and that I do not limit myself to the specific form herein set forth, except where specified in the claims.

In the accompanying drawings.

Figure 1 is a side elevation, the staff being broken away, showing the hook arranged horizontally for trimming vertical or nearly vertical branches.

Fig. 2 is an edge view, the hook being arranged in alinement with the staff so as to be adapted to trim horizontal or nearly horizontal branches; and Fig. 3 is a side elevation showing the device as arranged in Fig. 2.

The staff 1 will be of the usual, or preferred, dimensions suitable to the uses to which tree trimmers are put.

Located on opposite sides of the upper end of the staff are metal straps or plates 2 and 3 which are connected by bolts and nuts 4 running through holes 5 in said straps and through holes 6 in the staff 1.

The bolts are removable and the metal strap 3 is adapted to be secured by said bolts either in the position shown in Fig. 1 or as shown in Fig. 2, according to whether it is desired to locate the hook and knife for trimming vertical or nearly vertical branches or to dispose them so that they will be adapted to trim horizontal or nearly horizontal branches.

The hook 7 embodies two pieces of strap metal which are provided with spacers 8 and are separated by a slot 9, the sections of the hook being riveted together. The shanks of the hook sections are arranged divergently and a filler block 10 is interposed between them and secured by rivets.

One of the shanks of the hook is hinged at 11 to the strap 2. The other shank of the other section of the hook is connected to the strap 3 by a short plate or link 12 which is hinged to said strap 3 at 13 and to the shank of the hook at 14.

When the straps 2 and 3 are bolted together as shown in Fig. 1, the hook 7 is then arranged at right angles to the staff 1 which adapts the hook and knife for trimming limbs or branches that are arranged vertically or substantially so. When it is desired to trim limbs or branches which are arranged horizontally, or substantially so, the bolts 4 are removed, and the strap 3 is slid downwardly until the hook 7 is lined up with the length of staff 1. The bolts 4 are then used to fasten the straps to the staff.

The knife or cutter 15 is pivoted at 16 to the hook 7 and operates in the usual manner to cut off a limb or branch.

For operating the knife 15, operative means are provided adapted to be used either when the hook 7 is arranged at right angles to staff 1 or when in alinement therewith. A three-armed lever 17 is pivoted to the staff on a bolt 18. One of its arms is connected by link 19 to the knife 15. The other arm is connected by a rod 20 to an operating handle 21 which is pivoted to the staff at 22. The rod works in guides 23 on the staff.

I claim:

1. In a tree trimmer, the combination with a staff, of a pair of plates or straps located on opposite sides of the staff, means securing said plates or straps to the staff with adaptability for relatively sliding adjustment, a hook directly hinged to one of said straps or plates, a knife or cutter pivoted to the hook, a plate or link hinged to the hook and to the other strap or plate, said plates and connections adapting the hook to be secured in different positions in relation to the staff, and operating means carried by the staff adapted for actuating the knife or cutter.

2. In a tree trimmer, the combination with a staff, of a pair of plates or straps located on opposite sides of the staff, means securing said plates or straps to the staff with the adaptability for relatively sliding adjustment, a hook directly hinged to one of said straps or plates, a knife or cutter pivoted to the hook, a plate or link hinged to the hook and to the other strap or plate, said plates and connections adapting the hook to be secured in different positions in relation to the staff, a three-armed lever pivoted to the staff, a link connecting one arm of the lever to the knife or cutter, an operating handle pivoted to the staff, and a rod connecting said operating handle to the other arm of the lever.

In testimony whereof I affix my signature.

HAROLD LYNN.